Figure 15:
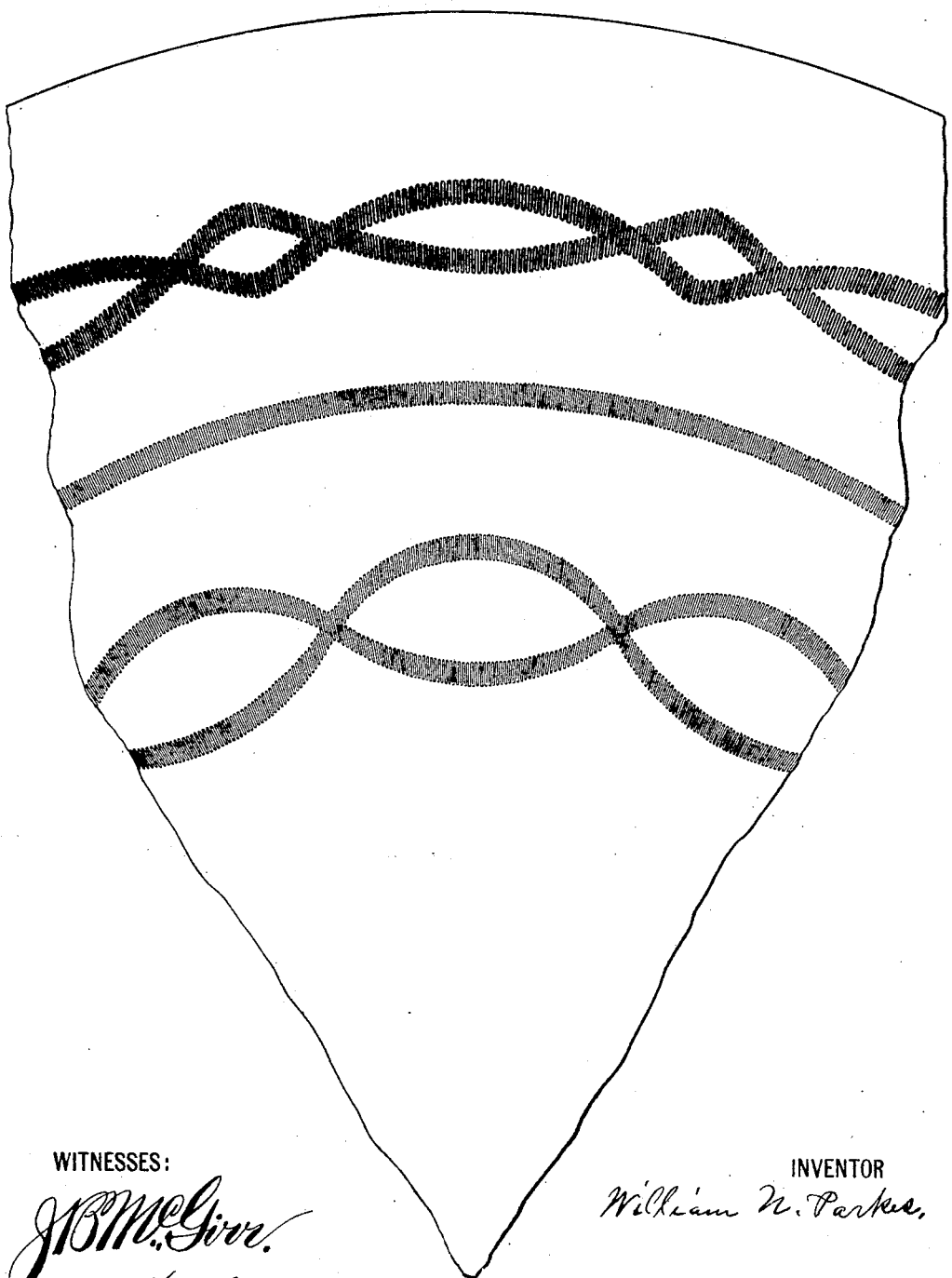

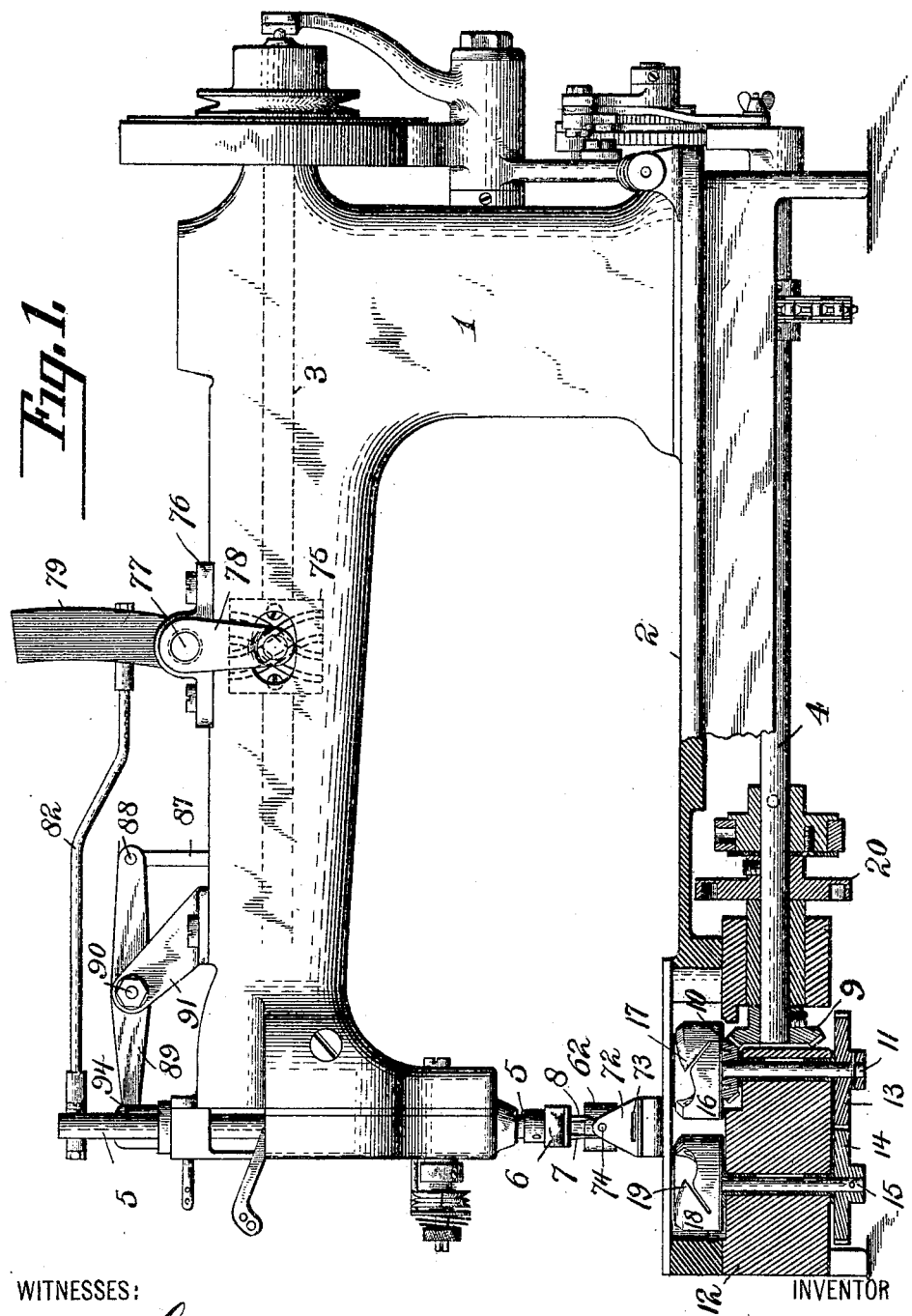

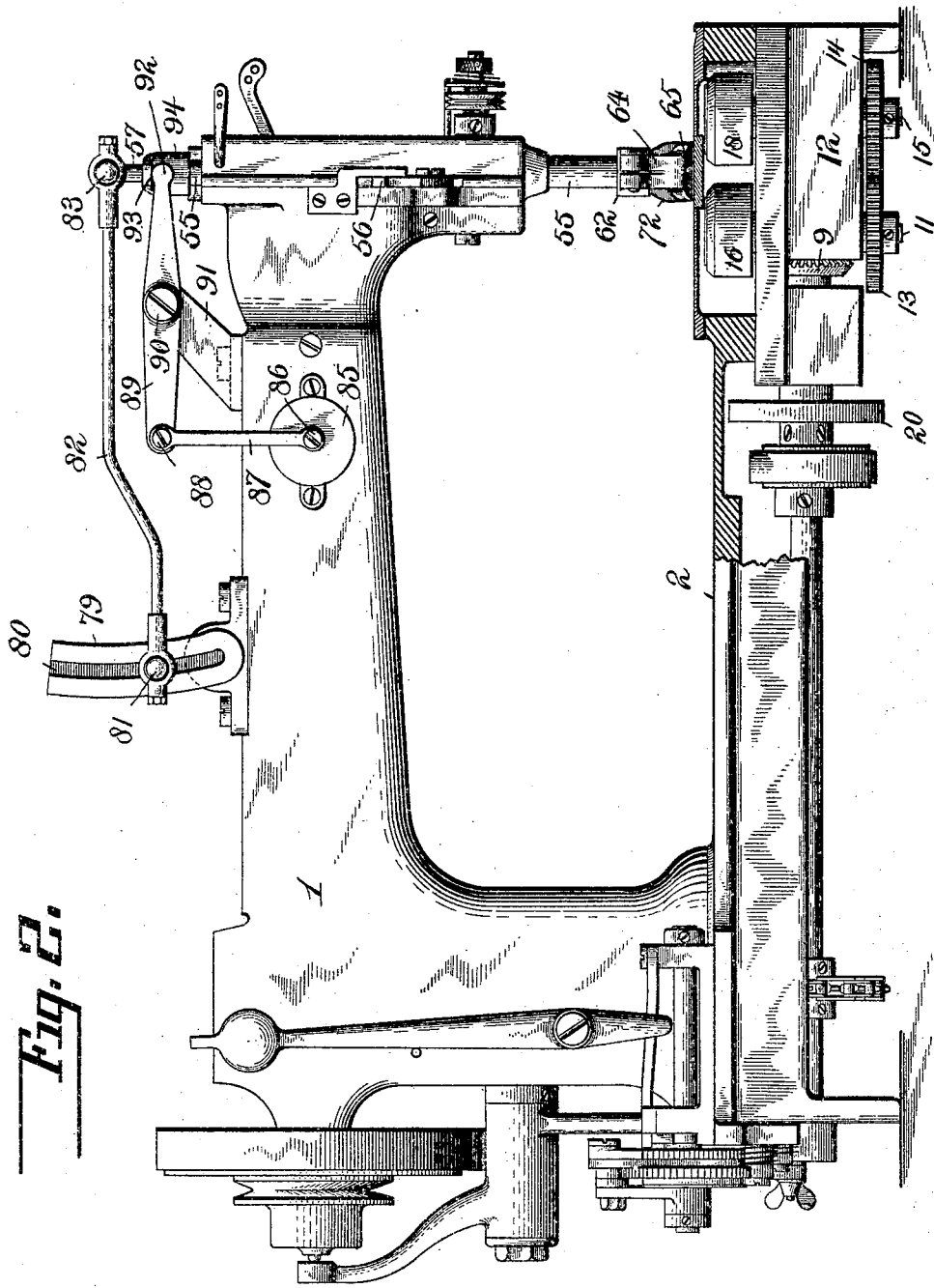

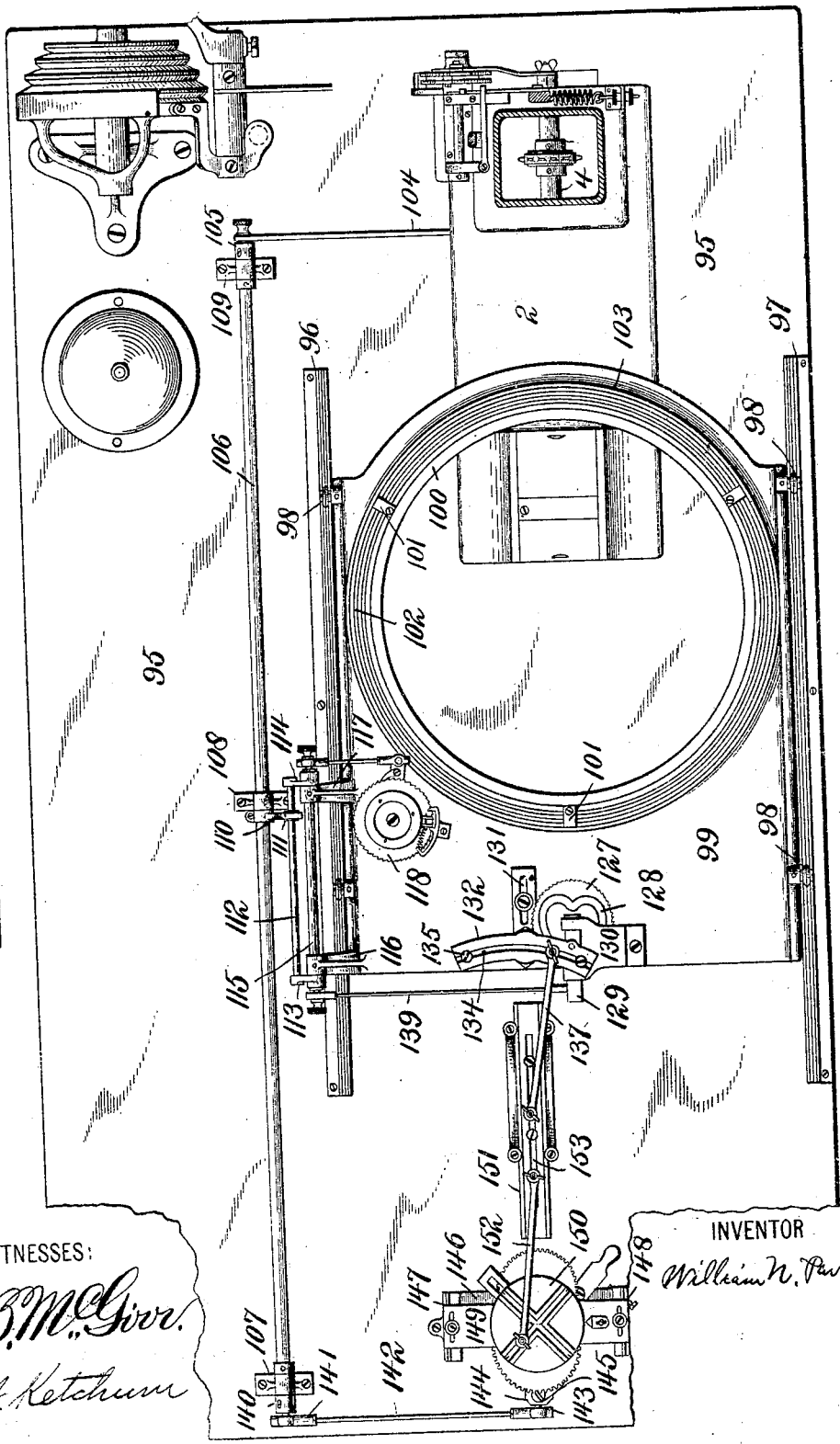

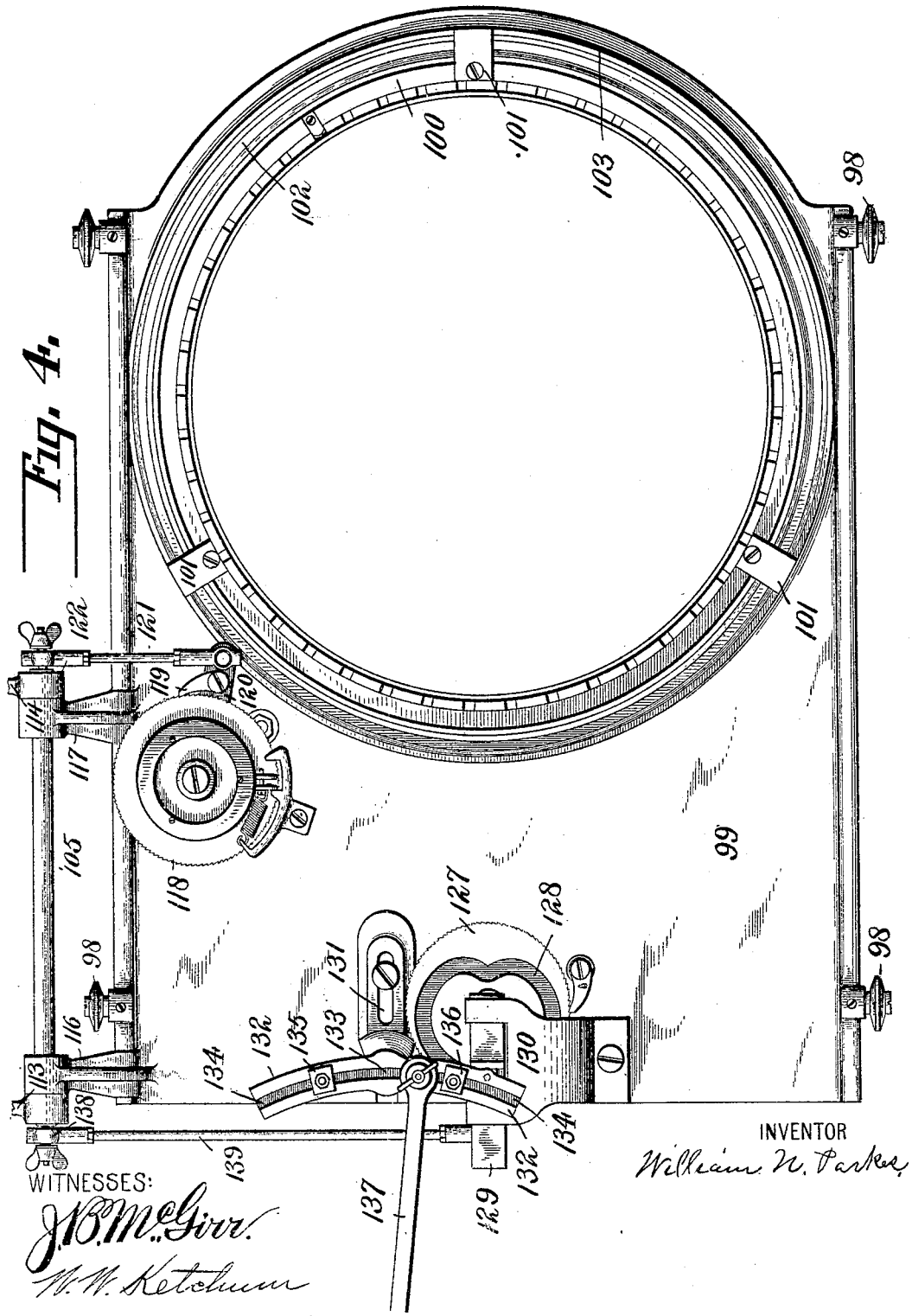

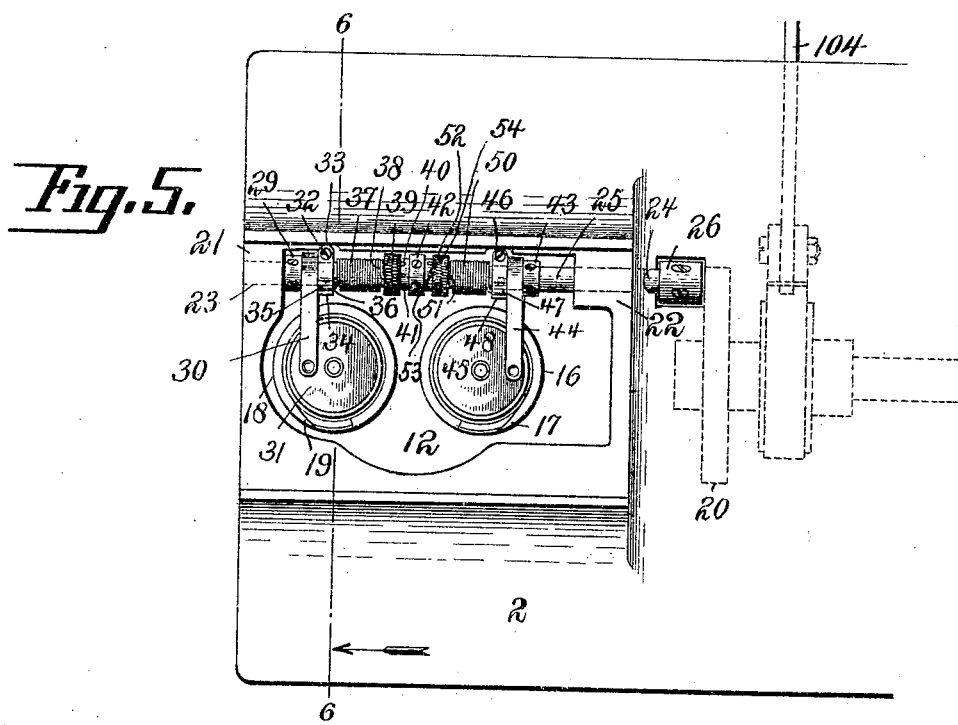
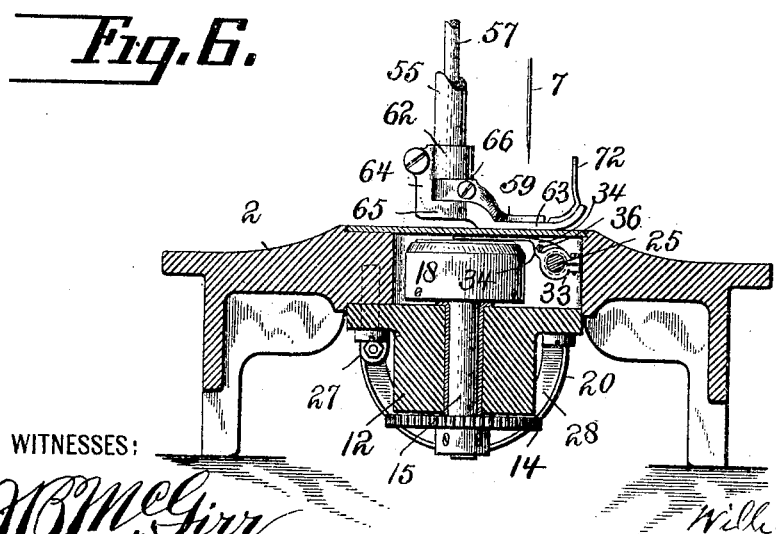

W. N. PARKES.
EMBROIDERY OR ORNAMENTAL STITCH SEWING MACHINE.
APPLICATION FILED DEC. 29, 1905.
946,150.
Patented Jan. 11, 1910.
8 SHEETS—SHEET 6.
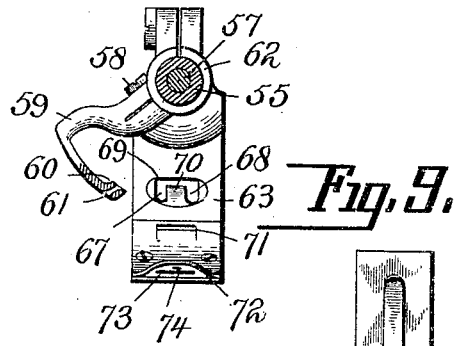
Fig. 7.
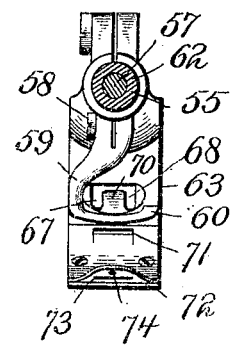
Fig. 8.
Fig. 9.
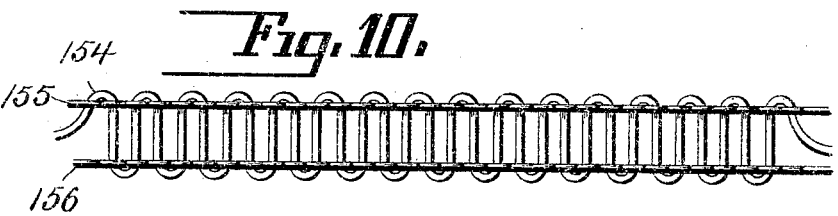
Fig. 10.
Fig. 11.
WITNESSES:
J. B. McGirr.
W. W. Ketchum.
INVENTOR
William N. Parkes.

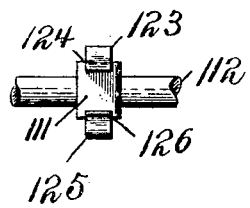
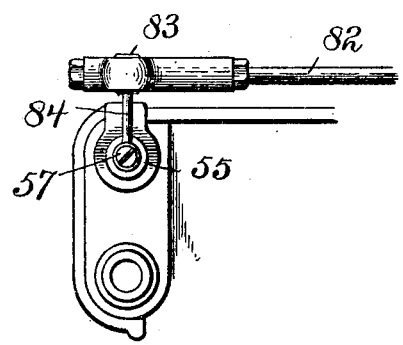
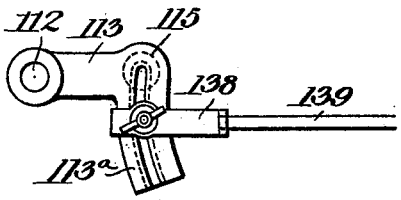
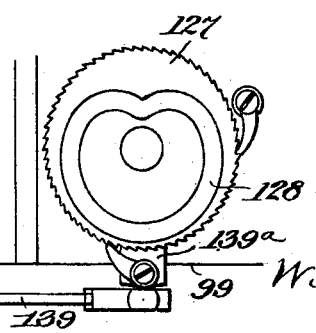

UNITED STATES PATENT OFFICE.

WILLIAM N. PARKES, OF BROOKLYN, NEW YORK, ASSIGNOR TO THE PARKES MACHINE COMPANY, OF NEW YORK, N. Y., A CORPORATION OF NEW YORK.

EMBROIDERY OR ORNAMENTAL STITCH SEWING MACHINE.

946,150. Specification of Letters Patent. Patented Jan. 11, 1910.

Application filed December 29, 1905. Serial No. 293,778.

*To all whom it may concern:*

Be it known that I, WILLIAM N. PARKES, a citizen of the United States, residing in Brooklyn, county of Kings, and State of New York, have invented a new and useful Improvement in Embroidery or Ornamental Stitch Sewing Machines, of which the following is a description.

This invention relates to the kind of embroidery and ornamental stitch sewing machine disclosed in Patents Nos. 652,326, and 693,666, issued to me June 26, 1900, and February 18, 1902, respectively. And to the embroidery and ornamental stitch sewing machines illustrated and described in my copending applications, Serial No. 288,208, filed November 20, 1905, and patented Dec. 31, 1907 with number 875,624 and Serial No. 289,324, filed November 27, 1905, and Serial No. 289,646, filed November 29, 1905 and patented Dec. 31, 1907, with number 875,625. In these machines the needle is moved laterally, and the threads are deposited across the lateral zone of vibration of the needle on both sides of the fabric, and means are provided for producing a relative lateral movement between the stitch forming mechanism and the work whereby various ornamental designs are embroidered or stitched.

The invention consists of the parts and combination of parts illustrated and described and specifically set forth in the claims.

Referring to the drawings: Figure 1 is a front elevation of the machine, parts broken away to show the construction and arrangement of the looper mechanism. Fig. 2 is a rear elevation of the machine, parts broken away to show the location of the looper mechanism. Fig. 3 is a top plan view of the machine, the arm being removed to show the parts under the same. Fig. 4 is a plan view of the carriage and the work carrier. Fig. 5 is a top plan view of the forward end of the base of the machine with the several plates removed to show the location and arrangements of the hook and bobbin controller. Fig. 6 is a sectional detail taken on the lines 6—6 of Fig. 5, looking in the direction of the arrow. Figs. 7 and 8 are details of the foot, showing the auxiliary thread carrying arm in position thereon. Fig. 9 is a top plan view of the throat or needle plate. Fig. 10 is a diagrammatic view of some of the stitching done on this machine, and Fig. 11 is an under view of said stitching. Fig. 12 is a plan view of a detail in connection with the driving mechanism for the auxiliary looper. Fig. 13 is a detail in connection with the auxiliary finger operating mechanism. Fig. 14 is a diagrammatic view of one form of stitch made when a single needle is used, and Fig. 15 is a part of one of the many designs automatically stitched on this machine. Figs. 16 and 17 illustrate details in the driving mechanism for the ratchet wheel 127.

In the drawings, 1 is the arm of the machine, 2 the base, 3 the driving shaft, and 4 the looper shaft. The looper shaft is driven in a usual manner from the driving shaft of the machine, and revolves in unison with the same, and these shafts are journaled in usual bearings.

A needle-bar 5 is located in usual bearings in the forward end of the arm of the machine, and is reciprocated in a usual manner by the driving shaft. To the lower end of said needle-bar, is secured a needle clamp 6, which carries in a usual manner, needles 7 and 8.

To the forward end of the looper shaft, is secured a gear 9, which is in engagement with a gear 10. The gear 10 is secured to the upper end of a vertically disposed shaft 11, which is journaled in a bracket 12, that is secured to the under side of the base 2 of the machine. On the lower end of the shaft 11, is secured a gear 13, which is in engagement with a gear 14, the latter being secured to the lower end of a vertically disposed shaft 15 that is also journaled in the bracket 12. To the upper end of the shaft 11, is secured a looper 16, on which is formed a beak 17, and to the upper end of the shaft 15, is secured a looper 18, on which is formed a beak 19. The gear 9 is twice the diameter of the gear 10, and it is therefore to be understood that the loopers revolve twice to each reciprocation of the needles.

In my copending application, Serial No. 154,457, filed April 27, 1903, patented Dec. 31, 1907, No. 875,613, bobbin controller mechanism for sewing machines, are shown means for automatically controlling a single bobbin. In my present application, I have adapted the mechanism shown in the said copending application to control two bobbins. This mechanism will now be described.

On the shaft 4, and next to the bearing for the forward end of the same, is secured a bobbin controller cam 20. In bearings 21 and 22, (Fig. 5), are journaled ends 23 and 24 of a short shaft 25. To the end 24 of the shaft 25, is secured the upper end 26 of an arm 27, the lower end of which is in engagement with a cam groove 28 formed in the cam 20. (Figs. 5 and 6). On the end 23 of the shaft 25, is secured a collar 29, which abuts the bearing 21, and the base 26 of the arm 27 is in contact with the bearing 22, and thus the shaft 25 is retained longitudinally in its bearings. On the shaft 25, and next to the collar 29, is pivoted a controller arm 30 the end of which is adapted to engage a bobbin 31 carried by the looper 19. Next to the base of said controller arm 30, on said shaft 25, is clamped by means of a screw 32 a part 33 on which is formed an extending lug 34. In the side of the arm 30 is secured a pin 35 which rests on the lug 34. A hole (not shown) is bored in the end of the pin 35, and in said hole is located an extending end 36 of a spring 37, that is located on the shaft 25, as shown in Fig. 5. The other end 38 of said spring is located in a hole, not shown, that is formed in the side of an adjusting ring 39 that is secured to the shaft 25. A pin 40 is located in the side of the said adjusting ring, and said pin is adapted to engage notches 41 which are in the edge of a part 42, that is adjustably secured to said shaft 25. On the part 24 of the shaft 25, is secured a collar 43, and next to said collar, is pivoted a controller arm 44 that is adapted to engage a bobbin 45 carried by the looper 16. Next to the base of the controller 44 is a part 46 that is clamped to the shaft 25. In the side of the arm 44, is a pin 47 which rests on a lug 48 formed on the part 46. In a bore, (not shown), formed in the end of the pin, is located one end 49 of a spring 50 that is located on the shaft 25, and the other end 51 of said spring is located in a bore (not shown) in the side of an adjusting ring 52. The adjusting ring 52 carries a pin 53 which is adapted to engage notches 54 formed in the edge of the part 42. The springs 35 and 50 normally turn the arms 30 and 44 so that the pins 34 and 47 press on the lugs 34 and 48. Referring now to the operation of this double bobbin controller mechanism, it is noted that the cam groove 28 is so constructed that the arm 27 is operated to turn the shaft 25, and thereby lift the controllers from the bobbins just previous to the passage of the loops of needle threads between the controllers and the bobbins. As it is only necessary to make a passage for the loops of needle thread between the bobbins and controllers, it is evident that it is only necessary to have a very small movement of the arms 30 and 44, and of course a very easy cam action in the groove 28. The adjusting rings 39 and 52, and their means of engagement with the notches in the part 42 serve as a means for increasing or decreasing the tension of the springs on the arms 30 and 44. The parts 33 and 46 serve as a means for lifting the arms 30 and 44 from the bobbins when the shaft 25 is oscillated. Said parts 33 and 46 are clamped to the shaft 25, and it is to be understood that they may be readily adjusted so as to bring the lugs that are formed on them, in proper position for performing their function. For a further explanation and details of the operation of this bobbin controller mechanism, and the advantages of the same, see the before mentioned copending application, Serial No. 154,457.

The means for securing the auxiliary embroidery thread or material to one side only of the fabric, will now be described.

In the forward end of the machine, is mounted in a usual manner, a presser-bar 55, which is depressed in a usual manner by a usual presser-bar spring not shown. A usual presser-bar lifter 56 is adapted to lift said presser-bar against the pressure of the presser-bar spring. Longitudinally through said presser-bar passes a bore in which is located a rod or bar 57. To the lower end of said rod is clamped by means of a screw 58, a thread or cord carrying finger 59, as shown in Figs. 7 and 8. Near the end of said finger and on the inner side of the same, is formed a small boss 60, and through said boss, passes a delivery eye 61. To the lower end of the presser-bar 55, is clamped a base 62 of a presser foot 63. A vertical portion 64 extends from the base to a horizontal portion 65, which terminates into the presser foot 63. Intermediate the base and the part 65 of the presser foot, is a way 66, and in this way the base of the finger 59 just fits and serves as a means for retaining the rod 57 longitudinally in the bar 55. (Fig. 6). In the presser foot, are formed needle openings 67 and 68 which are connected by a thread passage slot 69, and intermediate the openings 67 and 68, is a tongue 70. Through the presser foot, in front of the needle openings, passes a slot 71, and through the upturned end 72 passes a slot 73. Just above the slot 73, passes an eye 74.

On the driving shaft of the machine, is secured a switch cam 75. In a bracket 76, which is attached to the top of the arm of the machine, is journaled a short shaft 77 to the front end of which is secured an arm 78, the lower end of said arm being in engagement, in a usual manner, with the switch cam 75. To the rear end of the shaft 77, is secured an upwardly extending arm 79, in the face of which is formed a way 80, that extends over the axis of the shaft 77. In said way, is adjustably secured at 81, the rear end of a connection 82. The forward end of said connection is connected at 83 to the end of an arm 84, which is secured in the upper end of the rod 57.

The means for lifting the presser foot from the work, and holding the same from the work during the movement of the same, are as follows: By any suitable gearing, such for example as that which is shown in my application Serial No. 289,324, filed November 25, 1905, or in Fig. 1 of my Patent No. 693,666, issued February 18, 1902, a disk is revolved from the movement of the driving shaft of the machine. On the said disk, is pivoted at 86, the lower end of a link connection 87, the upper end of which is connected at 88 to the rear end of a lever 89. The lever 89 is pivoted at 90 to a bracket 91, carried by the arm of the machine. The forward end of said lever is at 92 in engagement with a lug 93 extending horizontally from a sleeve 94 that is secured to the top of the presser-bar 55. Referring to the operation of this device for lifting the presser foot, it is noted, the parts are timed so the foot is lifted from the work just previous to the movement of the same, and permitted to be returned to the work by the presser-bar spring just as the movement of the work ceases. In the operation of the machine, it is only desirable to just lift the foot from the work, and therefore only necessary to have a very slight movement of the presser-bar. Because of these conditions it is found in practice that the usual presser-bar spring will return the foot to the work properly, when the machine is running at a very high rate of speed, and therefore it is not necessary to move the foot into engagement with the work by positive means.

It is noted that the mechanism that is carried by the presser foot does not in any way interfere with the lifting of the foot from the work the required extent for the insertion and removal of the work from the machine, and the extent required for this purpose is of course, much greater than the extent required for the movement of the work during the operation of the machine.

Any of the work moving mechanisms shown and described in my before stated copending applications may be used in my present machine. The means for revolving the work shown in my said present machine, are the same as the means for this purpose shown and described in my said copending application, Serial Number 288,208. And the means for reciprocating the work, and changing the reciprocating position of the same, are the same as in my Patent 875,626.

The means for moving the work, will now be described.

To a table 95, on which the base 2 of the machine is located, are secured tracks 96 and 97 in which are formed suitable grooves for guiding wheels 98, that are carried by a work carrier carriage 99. In the carriage, is an opening in which is located a work carrier 100. To the work carrier are secured shoes 101 which are adapted to slide in a groove 102, that is formed in a raised portion 103 that extends around the work carrier opening in the carriage. These shoes and grooves serve as means for guiding the work carrier 100 as it revolves.

To the lower shaft 4 of the machine, is secured an eccentric as shown in dotted lines in Fig. 5, on which is pivoted one end of a pitman 104, the rear end of which is connected to an arm 105 that is attached to one end of a shaft 106. Said shaft is journaled in suitable bearings 107, 108, and 109, that are secured to the table 95. By the pitman connection 104 between the said eccentric, that is carried by the shaft 4, and the arm 105, that is carried by the shaft 106, the latter is oscillated.

To the shaft 106, is secured an arm 110 that is in engagement with a shoe 111 that is carried by a rod 112. The rod 112 is located at its ends in arms 113 and 114, that are secured to a shaft 115. The said shaft 115 is journaled in bearings 116 and 117 that extend upwardly from the edge of the carriage 95. In a suitable bearing on said carriage, is located a ratchet wheel 118, that is actuated by a pawl 199, which is carried by a pawl lever 120. The pawl lever is actuated by a connection 121 between the same and an arm 122, that extends downwardly from the base of the arm 114. A suitable gearing (not shown) between the ratchet wheel and the work carrier serves as means for revolving the carrier from the movement of said ratchet wheel. The arm 110 is forked at its ends, and prong 123 of said fork is located in a way 124 formed in the shoe 111, and prong 125 is located in a way 126 formed in the opposite side of said shoe, (Fig. 12). It will be thus understood that the shoe is retained from movement longitudinally of the shaft 112 by the forked end of said arm.

The means used in my before mentioned copending application, Serial No. 290,945, filed December 8, 1905, for giving the work carrier its primary reciprocating movement, will now be briefly described.

On the work carrier carriage 99, is pivoted to rotate a ratchet wheel 127. In the upper side of said ratchet wheel, is formed a cam groove 128, and by means (not shown) intermediate the same and a slide 129, the latter is reciprocated when the ratchet wheel is rotated. The slide 129 is suitably carried by a bracket 130, which latter is attached to the work carrier carriage. On the work carrier carriage, is adjustably secured a bracket 131, which carries a lever 132 that is pivoted at 133 in the said bracket. By a suitable connection between the slide 129 and the lever 132, the latter is oscillated when the slide is reciprocated. In the face of the lever, is formed a segmental way 134, which extends across the axis of the pivot of the lever 132. In the said way, are adjustably secured stops 135 and 136, and intermediate of said stops, in the way, is adjustably secured one end of a connection 137. On the base of the arm 113 and extending downwardly from the same is formed an arm 113ª, in the face of which is a way in which is adjustably secured the rear end 138 of the connection 139 (see Fig. 16). The forward end of said connection is secured to a pawl lever 139ª which carries a pawl that engages the ratchet wheel 127 as shown in Fig. 17. It will now be understood that if the ratchet wheel 127 is revolved, the lever 132 will be oscillated, and that if the connection 137 is held from movement, and the end of the same adjusted to one side of the pivot of the lever 132, the work carrier carriage will be reciprocated. This I call the primary reciprocating movement of the work carrier carriage.

I will now describe briefly, the means by which a secondary reciprocating movement is transmitted to the carriage.

To the rear end of the shaft 106, is secured an arm 140, to which is adjustably secured at 141, the rear end of a connection 142. The means for adjusting this connection toward and from the pivot of the arm 140, are of usual construction; so that the end of the connection 141 may be located over the axis of the shaft 106, or adjusted away from the same. The forward end of the connection 142 is at 143 connected to a pawl lever 144, which carries a pawl 145. The pawl 145 is in engagement with a ratchet wheel, (not shown), that is suitably pivoted in a bracket 146. The bracket has upwardly extending portions 147 and 148, which support a bridge 149. In the said bridge, is suitably mounted to rotate a disk 150. By suitable means described in my before mentioned copending application, Serial No. 290,945, filed December 8, 1905, the disk 150 is rotated when the ratchet wheel (not shown), is rotated.

The work carrier carriage is reciprocated from the rotating movement of the disk 150, through intermediate means between the carriage and the disk, as described in my said copending application, Serial No. 290,945, filed December 8, 1905. Briefly, this intermediate mechanism consists of a slide 151 adapted to reciprocate, and a connection 152 between said slide and the disk 150. In the slide is a way 153, and in this way, the forward end of a connection 152 is adjustably connected. And in the said way, the rear end of the connection 137 is also adjustably connected.

In the operation of the machine, the shaft 106 is oscillated, and from the movement of this shaft, and the intermediate mechanism, the ratchet wheels 118 and 127 are rotated. As the wheel 118 rotates, the work carrier is rotated; and as the wheel 127 rotates, the lever 132 is oscillated, and from this movement, the work carrier carriage is reciprocated. The disk 150 is rotated from the oscillation of the shaft 106, and by means of the connection between the same and the slide 151, the latter is reciprocated. In practice, the disk 150 revolves much slower than the ratchet wheel 127, and consequently, the slide 151 reciprocates much slower than the slide 129, and the lever 132 which is oscillated from the same. As the rear end of the connection 137 is secured to the slide 151, and as the said slide is mounted separately from the work carrier carriage, it is of course understood, that when the slide is reciprocated, the carriage is reciprocated; or the position of reciprocation of the carriage from the movement of the ratchet wheel 127, is changed laterally. By this work moving mechanism, that has been briefly described, it is to be understood that the work is rotated and reciprocated laterally simultaneously with said rotary movement, by the mechanism operated by the ratchet wheels 118 and 127. It is also to be understood that from the rotary movement of the disk, 150, and the mechanism intermediate the same and the lever 132, the reciprocating position of the work carrier carriage is automatically changed. The speed of the movement of the ratchet wheels 118 and 127 and the disk 150, are all separately adjustable and their angular position relative to each other, is also under adjustment. By these mechanisms, the work may be rotated and moved laterally in such manner as to locate the embroidery stitches so as to produce an endless variety of embroidered or stitched designs.

If it is desired to have the embroidery stitches deposited on the fabric, so as to make a wide path of embroidery, two needles are used in the machine, and these are separated the extent of the zone that its is desired to cover with the embroidery stitches. The loopers are of course, separated the proper distance for coöperation with the needles. These loopers as shown in my present application, are not under lateral adjustment relative to each other. In practice, if it is desired that the loopers be changed relative to each other laterally, a different bracket is provided, and the size of the gear wheels 13 and 14 are changed to correspond to the change in the lateral position of the loopers relative to each other.

In Fig. 10, 154 indicates an auxiliary thread or cord, and 155 and 156 the needle threads, by means of which, in combination with the looper threads, the auxiliary cord 154 is stitched to the fabric. In practice, for embroidery purposes, the work is moved forward so that the lateral strands of the auxiliary thread, lie right next to each other on the surface of the fabric, as indicated in Fig. 15.

If it is desired to run a tape or filling material under the embroidery threads, it is passed through the slot 74 and slot 71 under the presser foot. These slots are of such an extent, that the embroidery thread covers the tape or filling material run through the same. If it is desired to run through a piece of tape or the like, that is broader than the zone of embroidery stitches, the slots may of course, be made wide enough for this purpose.

The auxiliary thread is passed through the eye 74 to the eye 61 in the finger 59, and as this finger oscillates back and forth, the auxiliary thread is stitched to the fabric, as indicated in Fig. 10. As the auxiliary thread is stitched to the fabric, it extends across the tongue 70, which latter prevents undue strain on the fabric from the tension of the cord and threads.

While a plurality of needles and operating loopers are illustrated in this application, it is to be understood that a single needle may be used to advantage. For example, one of the loopers and needles may be removed from the machine, and an ornamental stitch effect produced. As means are provided for moving the work so as to cause the stitch to be deposited in an endless variety of designs, many very desirable effects may be produced in this machine, by the use of a single needle, and a coöperating looper.

It is to be understood, as before noted, that it is one of the main objects of this invention, to deposit the embroidery thread or cord on one side of the fabric only, in a machine of the character described. It is obvious that the means herein described for accomplishing this result may be varied without departing from the spirit of my invention. Therefore it is to be understood that applicant does not wish to be confined to the specific preferred form of his invention as herein disclosed.

In Fig. 11, is shown the underside of the stitching indicated in Fig. 10. In any of the designs stitched, when two loopers are used, as shown, the threads lie in a straight path on the underside of the fabric, as indicated in said Fig. 11; but it is to be understood that the device herein described, may be used to advantage in combination with a single looper, and a plurality of needles. When so used, the looper thread would cross the zone between the needles on the underside of the fabric, and the auxiliary thread the zone between the needles on the upper side of the fabric.

Having now described a preferred form of my invention, what I claim as new is:—

1. A sewing machine comprising two reciprocating needles disposed abreast, two loopers that revolve in a horizontal plane adapted to coöperate with said needles, an auxiliary thread or cord carrying device adapted to pass its thread back and forth under said needles, and mechanism for moving the work progressively forward and progressively laterally.

2. A sewing machine comprising mechanism for moving the work progressively forward and progressively laterally, a plurality of vertically reciprocating needles, a plurality of loopers adapted to coöperate with said needles, said loopers disposed to revolve in a horizontal plane, means for revolving said loopers, an auxiliary thread or cord carrying device adapted to coöperate with the needles, and means for operating said device.

3. A sewing machine comprising two reciprocating needles, a revolving work carrier, and means for revolving the same, means for producing a relative lateral movement between the needles and the revolving work carrier, and means for passing an auxiliary thread back and forth under said needles.

4. A sewing machine comprising a work carrier, mechanism for moving said work-carrier circularly, means for reciprocating said work carrier, a plurality of reciprocating needles, an auxiliary thread or cord carrier adapted to coöperate with said needles, and means for operating said auxiliary cord carrier.

5. A sewing machine comprising a revolving and reciprocating work carrier, means for operating said work carrier, two reciprocating needles arranged to remain in the same position of reciprocation, and means for conveying an auxiliary thread back and forth under said needles.

6. A sewing machine comprising a revolving work-carrier, mechanism for revolving said work-carrier, a plurality of reciprocating needles, means for producing a relative lateral movement between said needles and said work-carrier, means for passing an auxiliary thread or cord back and forth under said needles, and a device for guiding a filling material under said auxiliary thread or cord.

7. A sewing machine comprising a reciprocating and revolving work carrier, means for operating said work carrier, a plurality of reciprocating needles, a presser-bar, a presser foot, and operating means carried by said presser-bar adapted to pass an auxiliary cord back and forth under said needles.

8. In combination in a sewing machine, a plurality of revolving loopers each of which is provided with a bobbin, an automatic bobbin controller device for controlling said bobbins, a plurality of reciprocating needles, an auxiliary thread or cord carrying device to coöperate with said needles, means for operating said device, mechanism for moving the work progressively forward, and means for producing a relative lateral movement between the work and the needles.

9. A sewing machine comprising a revolving and reciprocating work carrier, means for operating said work carrier, two reciprocating needles, a presser-bar having a bore extending longitudinally through it, a rod located to oscillate in the bore of said presser-bar, means for oscillating said rod, and an auxiliary thread carrying finger carried by said rod.

10. A sewing machine comprising a revolving and reciprocating work carrier, means for operating said work carrier, two reciprocating needles, a presser-bar having a bore extending longitudinally through it, a rod located in the bore of said presser-bar, means for oscillating said rod, an auxiliary thread carrying finger carried by said rod, a presser foot, and a tongue on said presser foot located intermediate the vertical reciprocating paths of said needles.

11. A sewing machine comprising a revolving and reciprocating work carrier, means for operating said work carrier, a plurality of needles, loopers adapted to coöperate with said needles, a thread carrying finger or the like, an operating cam, and means intermediate said cam and the finger whereby the finger is oscillated from the movement of the cam.

12. A sewing machine comprising a plurality of reciprocating needles, a work moving mechanism including means for moving the work forward and laterally, means for operating said work moving mechanism, a presser-bar, means for passing an auxiliary thread or cord back and forth under said needles carried by said presser-bar, and means for reciprocating the presser-bar.

13. A sewing machine comprising a plurality of reciprocating needles, a work moving mechanism including means for moving the work forward and laterally, means for operating said work moving mechanism, a presser-bar, means for passing an auxiliary thread or cord back and forth under said needles carried by said presser-bar, means for reciprocating the presser-bar comprising a lever adapted to oscillate, and means for oscillating the same.

14. A sewing machine comprising a revolving and reciprocating work carrier, means for operating said work carrier, a plurality of reciprocating needles, means for passing an auxiliary thread or cord back and forth under said needles, and means for guiding a filling material under said auxiliary thread or cord.

15. A sewing machine comprising a rotating and reciprocating work carrier, a presser-bar, a rod adapted to oscillate located in said presser-bar, a thread carrying finger carried by the lower end of said rod, an arm attached to the upper end of said rod, an oscillating lever, and a connection between said oscillating lever and said arm.

16. A sewing machine comprising two needles that reciprocate in a vertical plane, two loopers that revolve in a horizontal plane, each of said loopers provided with a bobbin, a bobbin controller mechanism for controlling said bobbins, an auxiliary thread or cord carrying device to coöperate with said needles, means for operating said device so that its thread or cord is passed back and forth under said needles, and means for moving the work progressively forward and progressively laterally.

In testimony whereof I have hereunto signed my name in the presence of two subscribing witnesses.

WILLIAM N. PARKES.

Witnesses:
J. B. McGIRR,
W. W. KETCHUM.